(12) United States Patent
Larson

(10) Patent No.: US 7,069,611 B2
(45) Date of Patent: Jul. 4, 2006

(54) REGIONAL BOARDING RAMP FOR COMMUTER AIRCRAFT

(75) Inventor: James Larson, Lloyd Harbor, NY (US)

(73) Assignee: Infra-Structures, Inc, Brentwood, NY (US)

( * ) Notice: Subject to any disclaimer, the term of this patent is extended or adjusted under 35 U.S.C. 154(b) by 0 days.

(21) Appl. No.: 09/854,082

(22) Filed: May 11, 2001

(65) Prior Publication Data

US 2004/0211014 A1    Oct. 28, 2004

Related U.S. Application Data

(60) Provisional application No. 60/203,722, filed on May 12, 2000.

(51) Int. Cl.
*E01D 1/00* (2006.01)
(52) U.S. Cl. .................... 14/71.3; 14/71.1; 14/71.5
(58) Field of Classification Search ......... 14/69.5–72.5
See application file for complete search history.

(56) References Cited

U.S. PATENT DOCUMENTS

| | | | | | |
|---|---|---|---|---|---|
| 2,362,170 | A | * | 11/1944 | Swaisgood | 182/1 |
| 2,470,337 | A | * | 5/1949 | Campbell | 182/129 |
| 2,828,757 | A | * | 4/1958 | Thaxton, Jr. | 135/97 |
| 3,131,705 | A | * | 5/1964 | Marino | 135/131 |
| 3,599,262 | A | * | 8/1971 | Carder et al. | 14/71.5 |
| 3,683,440 | A | * | 8/1972 | Xenakis et al. | 14/71.5 |
| 3,687,321 | A | * | 8/1972 | Goodhart et al. | 414/495 |
| 3,845,591 | A | * | 11/1974 | Stine | 52/67 |
| 3,944,096 | A | * | 3/1976 | Carder | 414/345 |
| 3,964,118 | A | * | 6/1976 | Meyers et al. | 14/72.5 |
| 4,084,713 | A | * | 4/1978 | Rohrs et al. | 414/537 |
| 4,161,049 | A | * | 7/1979 | Saunders et al. | 14/71.5 |
| 4,319,376 | A | * | 3/1982 | Saunders | 14/71.5 |
| 4,344,200 | A | * | 8/1982 | Farr et al. | 14/71.5 |
| 4,488,326 | A | * | 12/1984 | Cherry | 14/72.5 |
| 4,517,698 | A | * | 5/1985 | LAmp'l et al. | 14/72.5 |
| 4,553,720 | A | * | 11/1985 | Harder | 244/137.2 |
| 4,768,617 | A | * | 9/1988 | Mason et al. | 182/71 |
| 4,886,413 | A | * | 12/1989 | Leon | 414/495 |
| 5,105,915 | A | * | 4/1992 | Gary | 187/200 |
| 5,137,114 | A | * | 8/1992 | Yde et al. | 182/49 |
| 5,226,204 | A | * | 7/1993 | Schoenberger et al. | 14/71.5 |
| 5,603,343 | A | * | 2/1997 | Larson | 135/131 |
| 6,055,692 | A | * | 5/2000 | Pell et al. | 14/71.5 |
| 6,330,726 | B1 | * | 12/2001 | Hone et al. | 14/71.5 |
| 6,481,039 | B1 | * | 11/2002 | Rolfe et al. | 14/72.5 |

* cited by examiner

*Primary Examiner*—Raymond Addie
(74) *Attorney, Agent, or Firm*—Jaspan Schlesinger Hoffman LLP

(57) ABSTRACT

A walkway having a series of fixed height corridor units and an inclined gangway unit at its forward end. The units are articulatingly connected and selectively collapsible. The gangway is selectively variable in height, being provided with elevating means at its front end, to permit docking at the raised door sill of the commuter aircraft.

13 Claims, 8 Drawing Sheets

REGIONAL BOARDING RAMP FOR COMMUTER AIRCRAFT

This application incorporates the subject matter of Provisional Application Ser. No. 60/203,722, filed May 12, 2000. All rights to said Provisional Application are claimed herein.

BACKGROUND OF THE INVENTION

The present invention relates to a walkway for protecting the movement of airline passengers to and from aircraft and in particular to a movable ramp passenger walkway for the protective movement of passengers between the ground and the doorway of the aircraft.

In my earlier U.S. Pat. No. 5,603,343 there is disclosed a collapsible articulating ground passageway having a plurality of independent U-shaped frame sections that are articulately connected in an end to end series to form a flexible corridor. The passageway disclosed in my prior patent is adapted to communicate with a commuter aircraft at a first end and with the airport terminal at the other. These passageways were designed and intended for use on the ground with smaller commuter type aircraft which generally have door sill wells below 6 feet and are generally provided with their own stairways. At present there still is no bridge or pathway apparatus which can dock with a commuter aircraft with a sill well between 6 and 16 feet in height having the capability of extending and retracting while simultaneously swinging left and right as well as varying in height to meet the individual sill wells of varying sized aircraft.

It is apparent that numerous innovations for walkways, loading bridges and similar devices have been provided in the prior art. However, even though these innovations may be suitable for the specific individual purposes to which they address, they would not be suitable for the purposes of the present invention as hereinafter described.

It is therefore, an object of the present invention to provide a passenger walkway overcoming the disadvantages inherent in the prior art.

It is an object of the present invention to provide a passenger walkway adapted to communicate between an airport ground terminal and a varying sized commuter aircraft having between a "zero" height application to a 16 foot height application.

It is yet another object of the present invention to provide a passenger walkway easily moved from one location to another.

It is still another object of the present invention to provide a passenger walkway with an integral floor from the terminal to the aircraft.

It is yet another object of the present invention to provide a passenger walkway can be easily deployed.

It is a further object of the present invention to provide a passenger walkway simple and inexpensive to manufacture and maintain.

The foregoing objects, together with other objects and advantages, will be apparent from the following disclosure of the present invention.

SUMMARY OF THE INVENTION

According to the present invention there is provided a walkway having a series of fixed height corridor sections and a ramp section. The sections are joined in an articulating manner so that the plurality of corridor sections may be deployed over a long distance as from a terminal or bus to the aircraft. Each section is provided with a floor to permit passengers to walk above the ground between the bus and the aircraft. The ramp section is variable in height to accommodate docking with aircraft of varying heights. A top and side cover of each section is provided with a weather proof fabric for protection of passengers from inclement weather as they pass to and from the aircraft.

Full details of the present invention are set forth in the following description and accompanying illustration of the invention.

BRIEF DESCRIPTION OF THE DRAWINGS

The invention will be best understood by reference to the following drawings, wherein.

DETAILED DESCRIPTION OF THE PREFERRED EMBODIMENT

Figure 1:
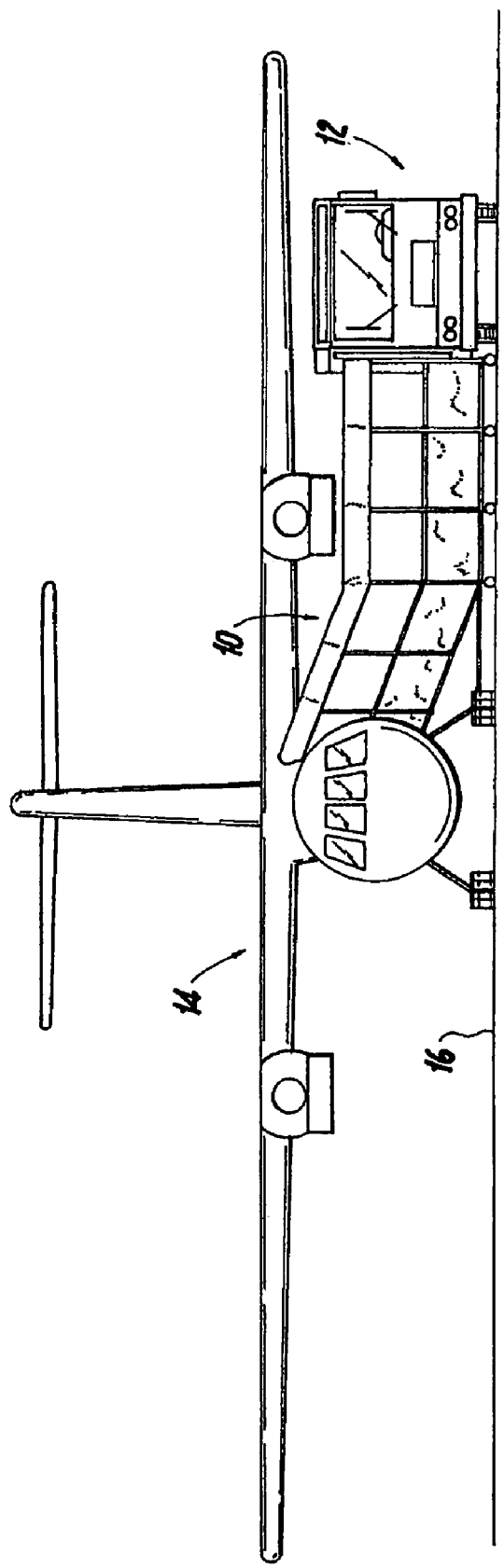
FIG. 1 is a side elevational view of the ramped passageway according to the present invention docked at one end to the terminal bus and at its other end to an aircraft.

The movable walkway of the present invention depicted by the numeral 10, is generally illustrated in FIG. 1. As illustrated the walkway is installed to permit passengers to walk from a bus 12 (or from a terminal exit) directly to an aircraft 14 waiting on the airport apron 16.

Figure 2:
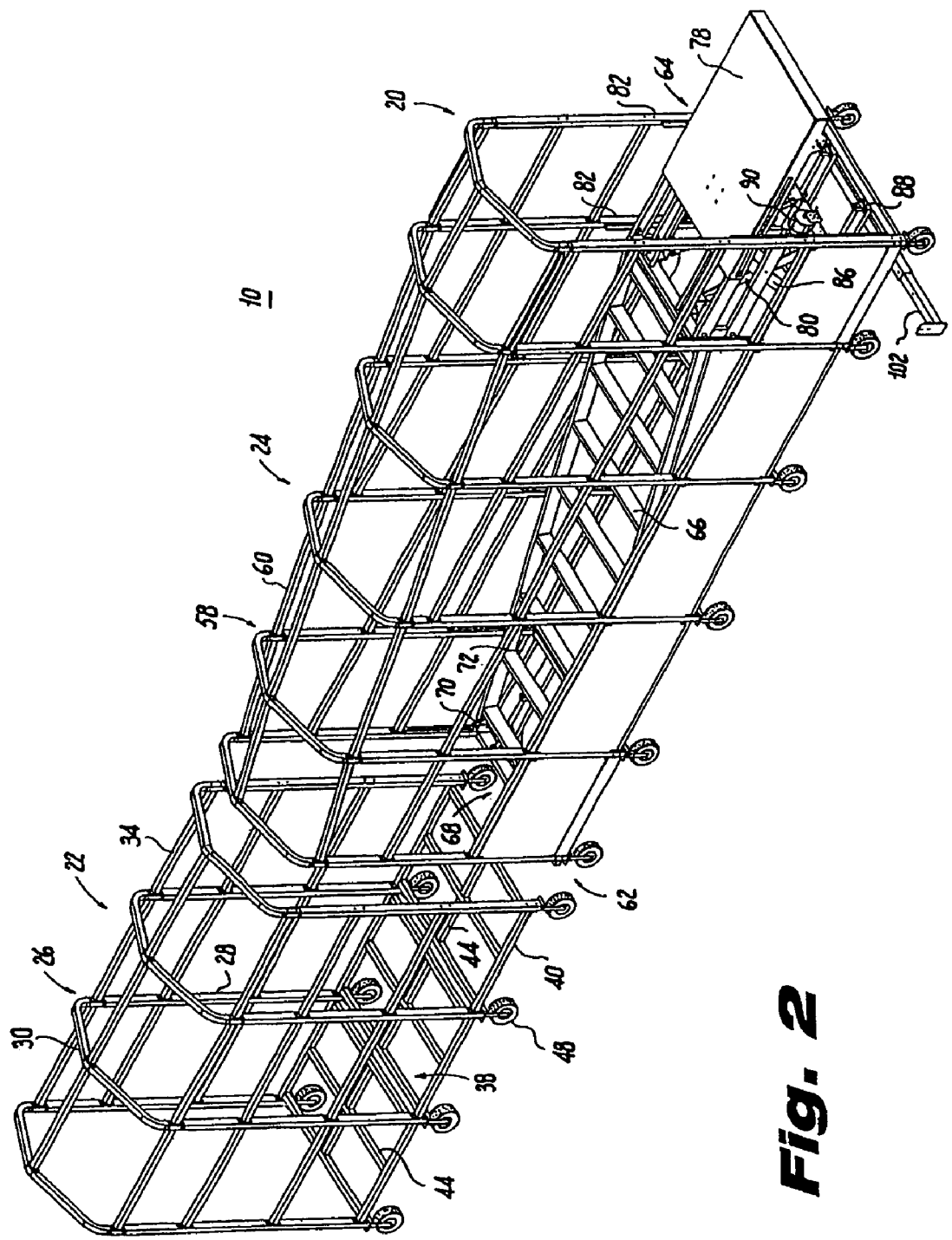
FIG. 2 is a perspective view of the frame structure forming the passageway shown in FIG. 1.

The construction of the walkway 10 is illustrated in FIG. 2, without any enclosure or covering. The walkway 10, thus is formed of frame like skeleton structures divided into a plurality of sections each similar in construction to that shown in my earlier patent, namely a plurality of partially collapsible fixed height corridor sections 22 (only one shown) and an inclined gangway section 24. The corridor sections 22 are articulately connected to each other and to the inclined gangway 24 in sequence, in a manner to be described hereinafter, with respect to FIG. 8.

Figure 3:
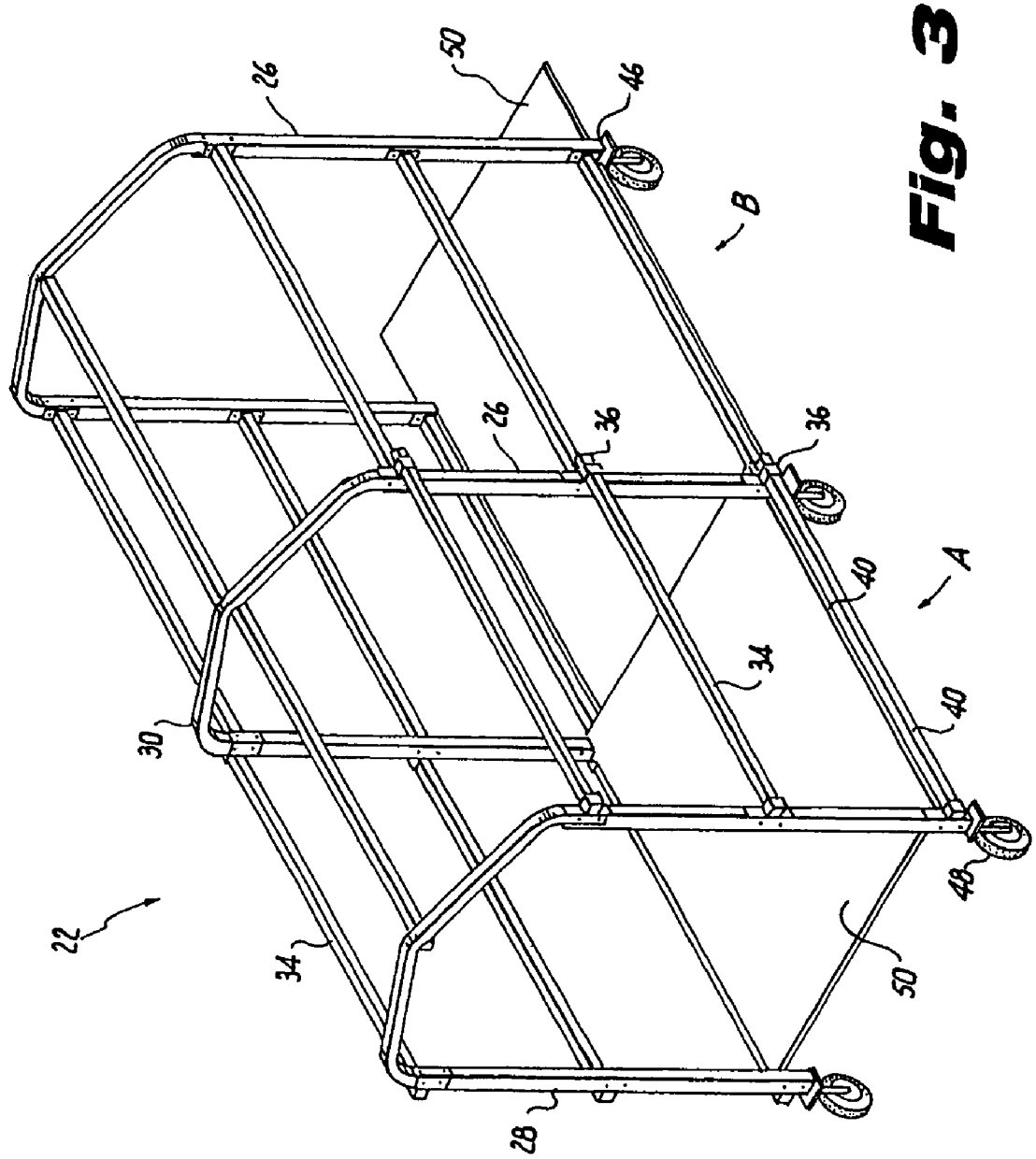
FIG. 3 is a perspective view of an expanded frame section of the passageway according to the present invention.
Figure 5:
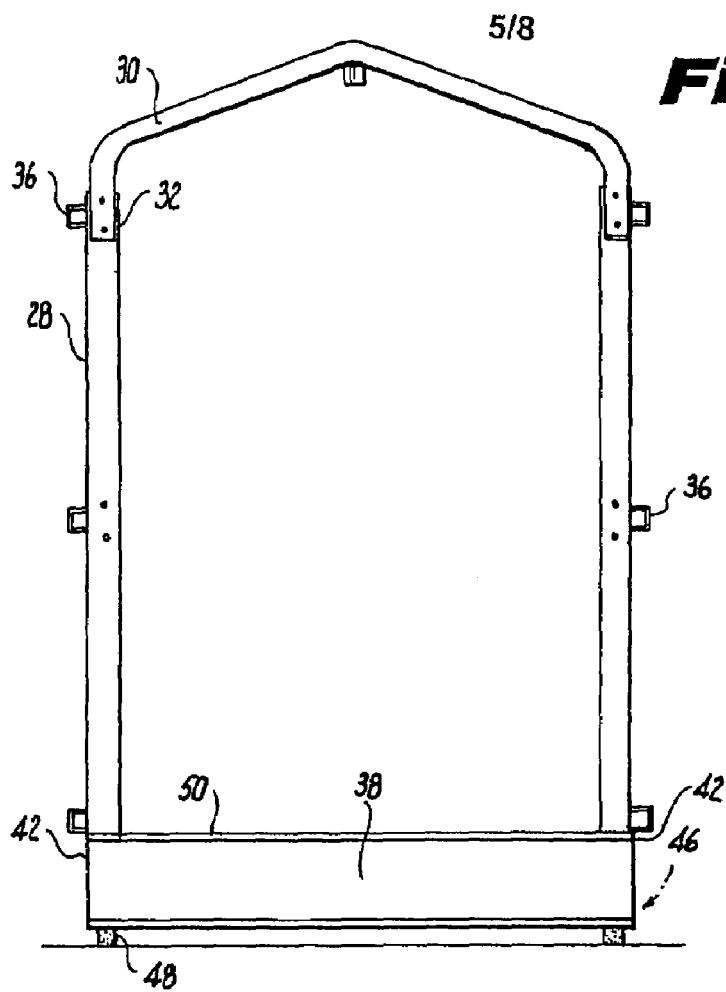
FIG. 5 is a front elevational view of the frame section shown in FIG. 3.

The construction of each corridor section 22 is shown in detail in FIGS. 3. through 7. Each corridor section 22 comprises a plurality of U-shaped supports 26. Preferably, three supports 26 are used, as such number enables construction of a corridor section of optimum length for movement, linear coverage and mass. Each support 26 is formed (FIG. 5) of a pair of vertically disposed tubular legs 28 and a connecting roof arch beam 30. The vertical legs 28 each terminate at their upper ends in a clevis 32 into which the respective ends of the individual arched roof beam 30 seat. The cross-section of the vertical upright legs 28 is somewhat larger than that of the arched roof beam 32 and suitable bolts or pins inserted therethrough hold the arched roof beam 32 fixedly to the upright legs 28 much in the manner shown in my earlier patent.

The U-shaped supports 26 are interconnected by a plurality of horizontal cross braces 34. Generally, the cross braces 34 will be fixed at each of their ends to the vertical legs 28, by suitable bolts or weldments so as to rigidly maintain the vertical supports 26 aligned and parallel with one another. In this arrangement, the length of each corridor 22 is fixed. Preferably, however, it is desirable to be able at least to partially collapse the corridor sections 22 so as to reduce their length permitting the overall length of the walkway to be reduced to meet the distance between bus (or terminal) 12 and the aircraft 14 and to reduce the overall bulk of the walkway 10 for storage.

To affect collapsibility of each corridor section 22 alternate vertical supports 26, (central support when only three supports are used) are provided with a cuff like guide 36 fixed in alignment with each of the braces 34. In this manner a three support corridor is divided into two portions, denominated for conveyance as the anterior A and the posterior B portions. The set of the braces 34, of the anterior portion are not attached to the center support but freely move through the corresponding guide 36. In this manner the portions A & B can seemingly telescope with respect to each other as seen in the figures.

A sub-flooring, generally depicted by the numeral 38 is provided as seen in detail in FIG. 2. The sub-flooring 38 comprises an array of longitudinal braces 40 similar to the braces 34 and arranged similarly as described above so that one set of braces 40 slide freely through cuff-like guides 42 fixed to the corresponding support 26, thus maintaining the collapsibility.

Figure 4A:
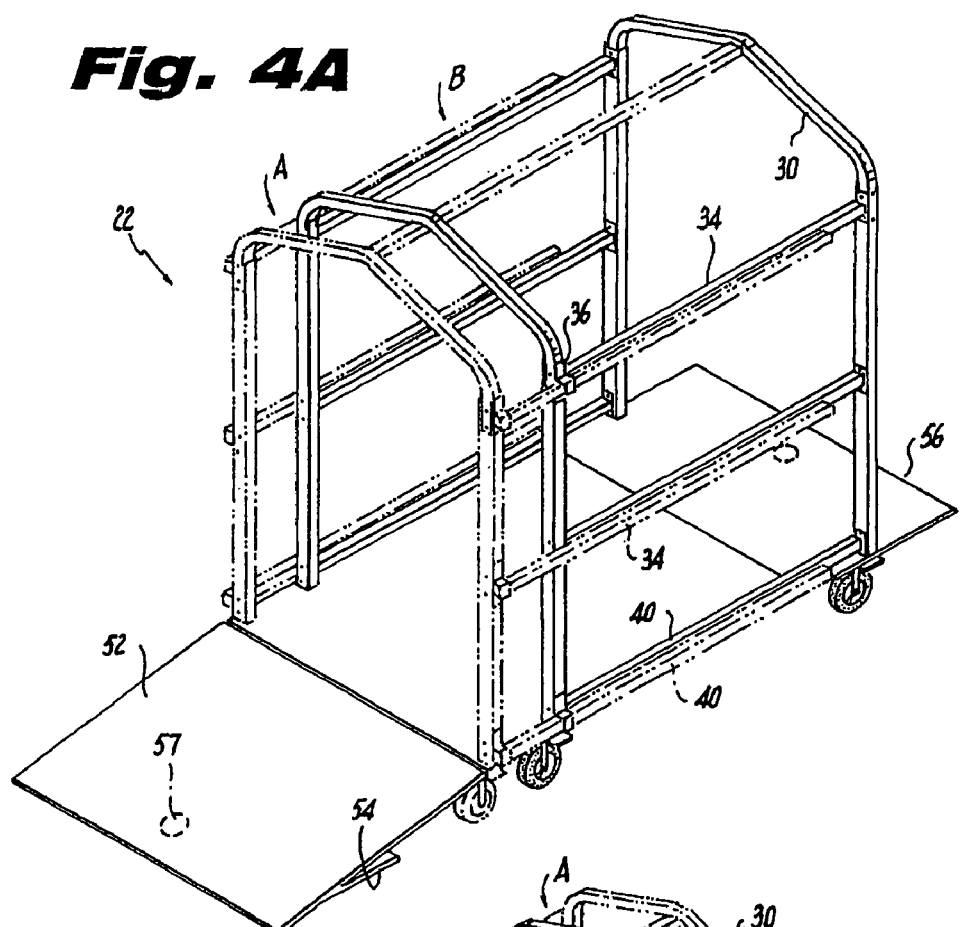
FIG. 4A is a perspective view of the frame sections shown in FIG. 3 with the frame section collapsed.
Figure 4B:
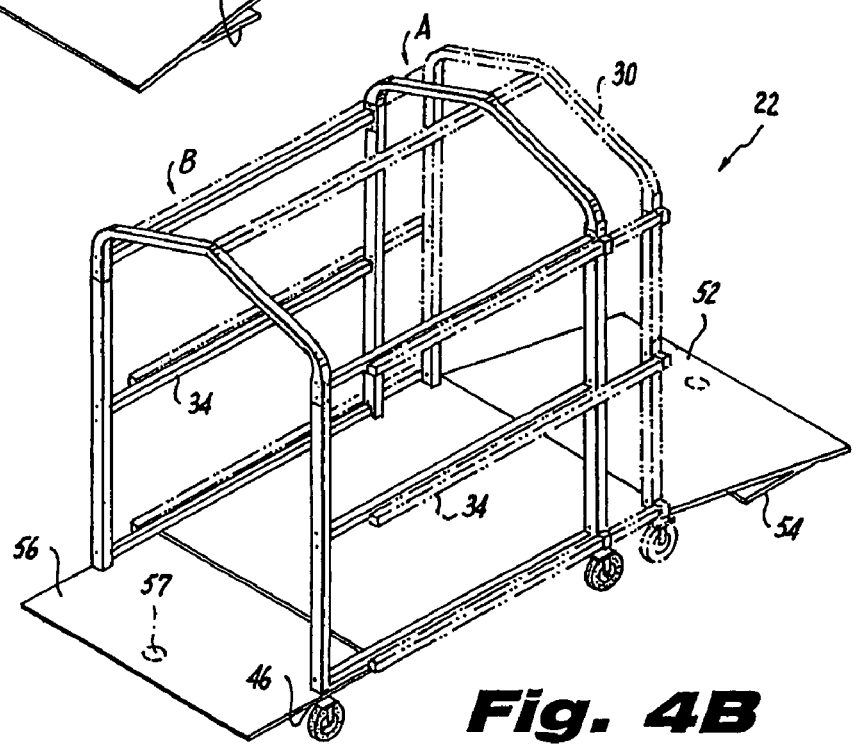
FIG. 4B is a reverse perspective view of the frame section shown in FIG. 4A.
Figure 6:
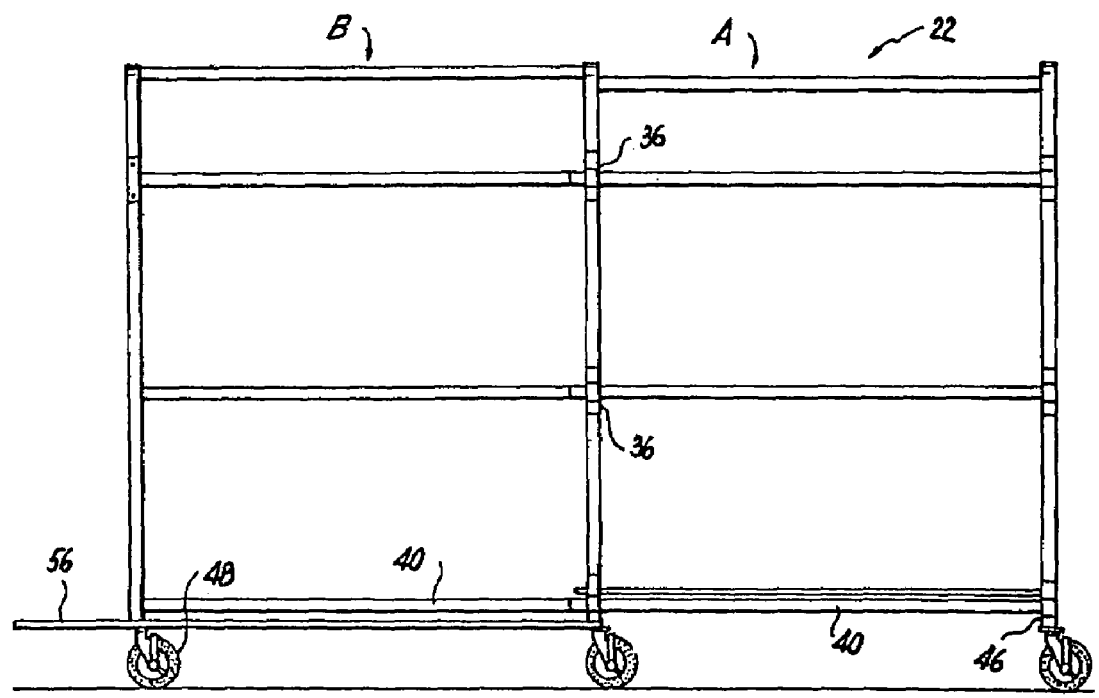
FIG. 6 is a side elevational view of the frame section shown in FIG. 3.
Figure 7:
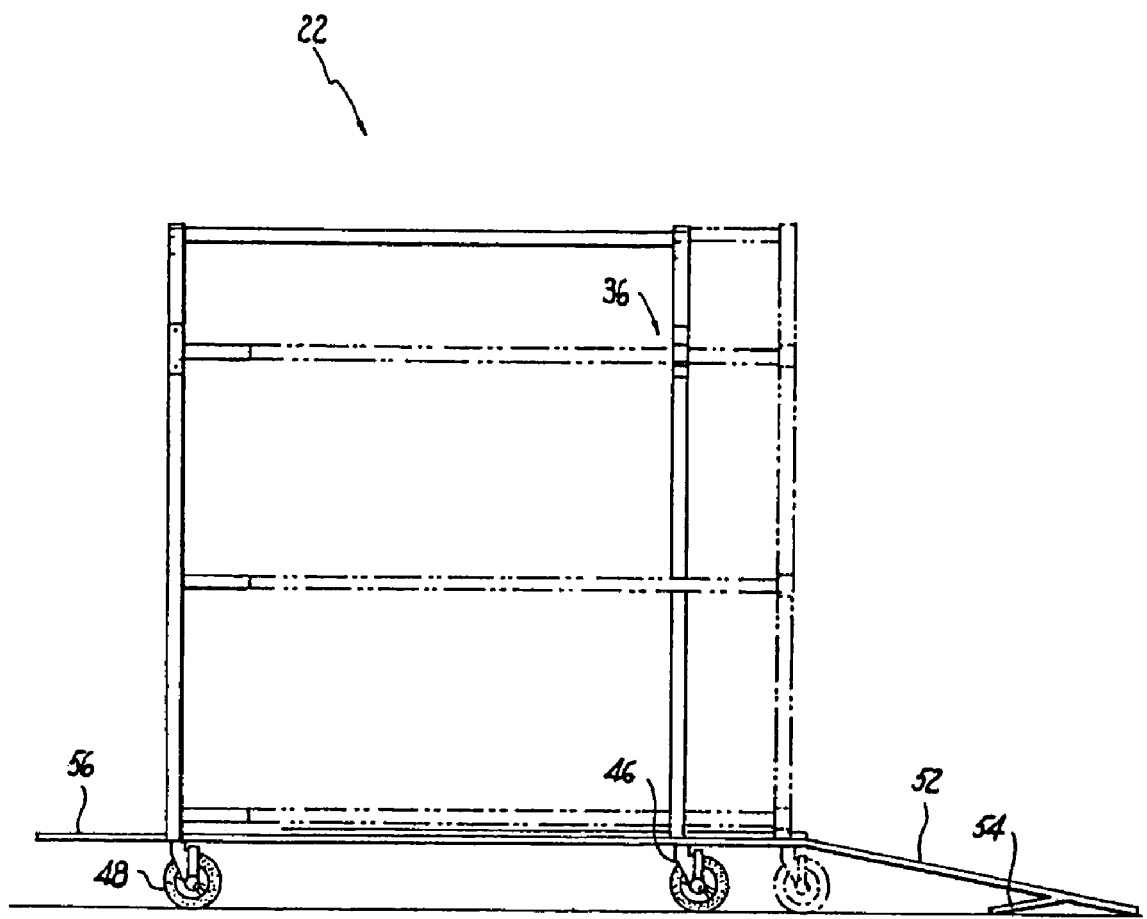
FIG. 7 is a side elevational view of the frame section shown in FIG. 4B.

Interconnecting the opposed floor brace 40 is an array of longitudinal and transverse floor beams 44. Each arrangement of braces 40 and floor beams 44 are staggered at different levels to each other, to maintain collapsibility, by sliding one over the other as seen in FIGS. 4a, 4b & 6. The sub-floor is arranged upward of the lower ends 46 of the vertical legs so as to be spaced from the ground. Each vertical leg 28 is provided with a roller or caster 48 at its lower end. (for the sake of clarity not all the drawings show the rollers.)

The floor of each section is completed by attaching a central deck plate 50 over each sub floor 38. At the free end of the deck plate 50 in the anterior portion A of each corridor there is attached an inclined transitional ramp 52, hanging down to the ground. The transitional ramp 52 is provided with a folded-in bottom 54 forming a lip resting stability on the ground. The free end of the deck plate 50 in the posterior portion B extends as a short shelf like member 56 adapted to extend outwardly over the adjacent floor in the next sequential corridor or gangway section. Of course the dimension of the sub-floor 38 and the plate 50 are such that telescoping movement of the anterior and posterior portions A and B are not hindered. The transitional ramp 52 and the extensions 56 are provided with holes 57 which will register with each other on serially arranging the corridors so as to form pivot bearings allow the corridors 22 to articulate or swing relative to each other with a defined arc.

Returning to FIG. 2, the gangway 24 is constructed having a plurality of vertically oriented U-shaped supports 58 and horizontal braces 60, similar to those used in formation of the rigid fixed section 22, except that they increase in height from the anterior end 62 where they are aligned and equal in height to those forming the corridor section 22 to a height at its posterior end 64 capable of fully enclosing the doorway opening of any commuter or small aircraft. A second distinction between the gangway 24 and the corridor 22 lies in the fact that the frame structure is not collapsible and the braces 60 are fixedly on the vertical supports held at each end as well as between the ends to form a fixed length passageway.

The gangway 24 is provided with a raisable sub-floor, generally depicted by the numeral 66 formed of parallel side beams and a plurality of cross beams in the arrangement of a ladder. The sub-floor 66 is pivotedly attached at its rear anterior end 68 to the lower beams of the gangway 24 so as to be raisable at its posterior end 64, by means of a carriage assembly 70 slideably mounted in the lower most anterior brace 72, which is formed in the shape of a c-channel. (see also FIG. 9.)

Secured over the sub-flooring 66 is one or more deck plates 74, forming a continuous ramp from the anterior end, 68 to the posterior end 64. At the posterior end 64, an auxiliary deck plate 76 extends forwardly to form a continuous extension ramp through the gangway 24.

Figure 9:
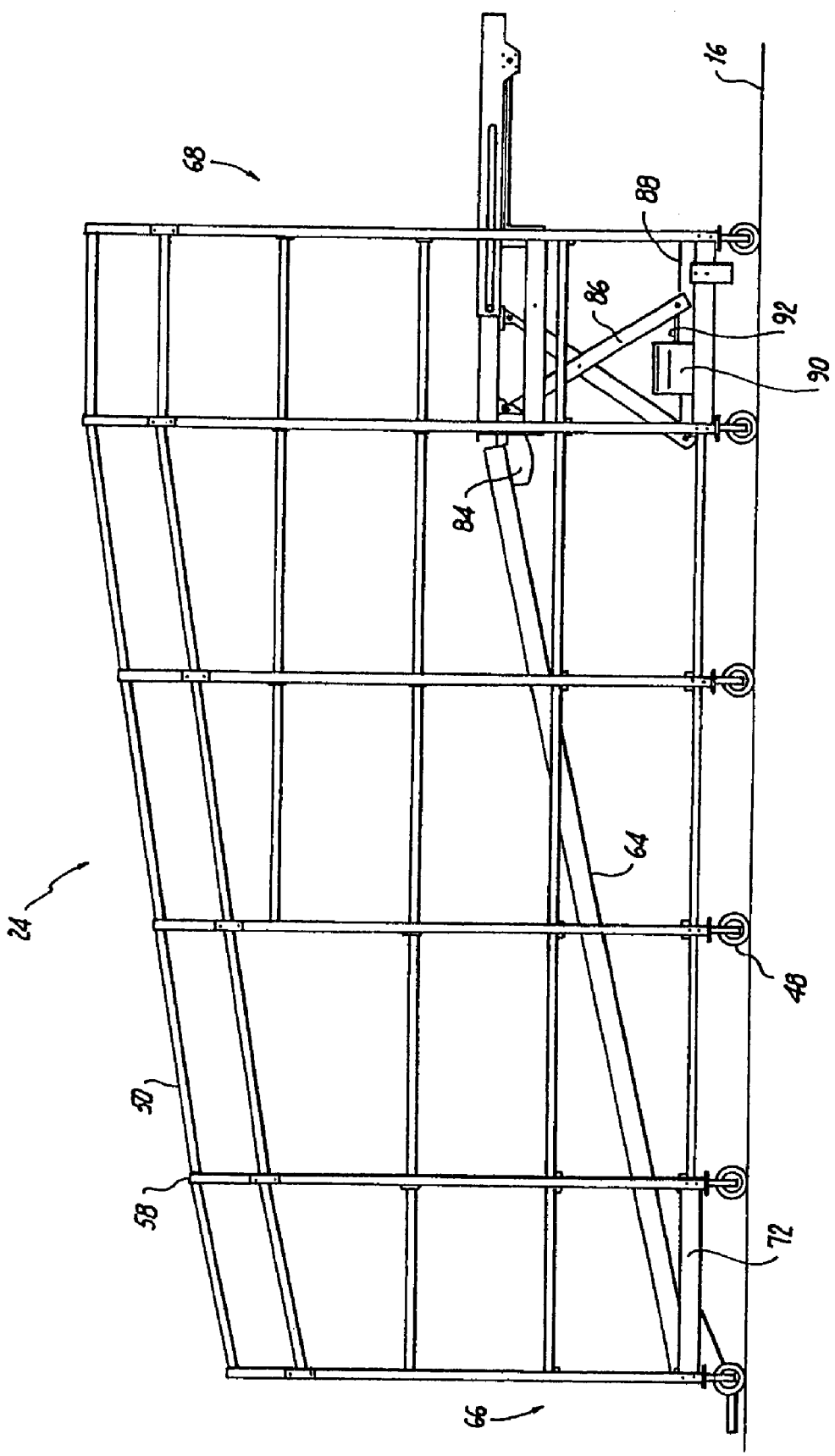
FIG. 9 is a side elevational view of the gangway section showing the various inner elements of the gangway.

At the extreme forward end of the gangway passage 24 there is located a horizontal stable platform 78, which is guided within a pair of horizontally opposed rails 80, so as to be able to reciprocally slide between a first position cantilevered outward from the gangway passage 24 to a second storage position within the gangway 24. The rails 80 are themselves guided by vertical tracks 82 and are connected to the posterior end of the sub-flooring 66, by a curved hinge 84 (FIG. 9).

The stable platform 78 is raised and lowered selectively by a scissor type elevating mechanism 86. The upper and lower ends of the scissor 86 ride is horizontal rails 88, fixed to the lower portion of the vertical support, while the upper ends of the scissors 86, ride in the respective horizontal rails 80. The scissor 86 is actuated by a reversible electric motor 90 and screw transmission system 92 to elevate the platforms 78 and the forward end of the sub-floor 66. Having the anterior end 68 of the sub-floor mounted in a slidable carriage 70 avoids binding or other problems, as the subfloor 66 is raised at the posterior end.

In this manner an inclined ramp 94 is formed within the gangway 24 which can be elevated to the proper height of the aircraft door and whereby the stable platform 78 can be extended to abut the door sill providing a smooth walking transition for the passengers from ground level to aircraft level.

Figure 8:
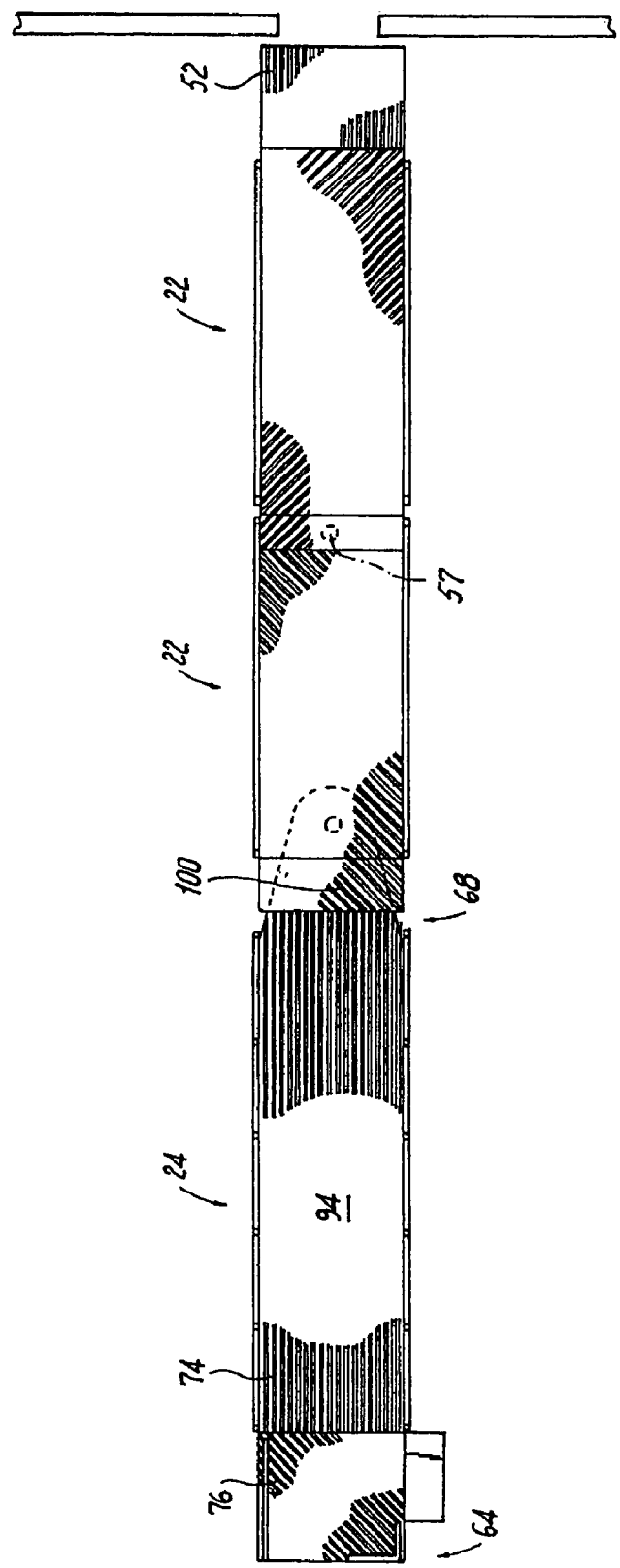
FIG. 8 is a top plan view of the walkway illustrating the articulated relationship between the sections.

As seen in FIG. 8 the anterior end of the inclined gangway 24 is provided with an extended tongue 100, which passes beneath the posterior shelf 56 of the adjacent corridor section 22, and is pinned thereto so as to permit the inclined gangway 24 to swing in an articulating arc. FIG. 8, also shows the pivot pin arranged between the aligned corridor section 22.

As seen in FIG. 2, there is provided a laterally extending bracket 102 fixed to the lower most portion of the posterior end of the gangway 24. This bracket 102 is employed to allow a motive drive device such as an electric cart to be hooked thereto enabling the operator of the cart to easily maneuver and move the walkway.

The corridor and inclined gangway sections 22 and 24 are covered in the manner described in my earlier patent with a fabric cover capable of maintaining suitable condition within the walkway no matter the anterior weather condition. The fabric may be provided with windows, removable panels or screens. As seen in FIG. 2, herein rigid plastic or metal wall panels can be installed along the bottom of the corridor or inclined gangway sections 22 and 24 to insure the absence of rain or snow with the passageway.

Thus it will be seen that the objects desired by the present invention have all been met.

Various embodiments and modifications have been suggested herein and other changes and modifications will be obvious to those skilled in this art. Therefore, it is intended that the present disclosure be given wide scope and the invention limited only by the claims appended hereto.

What is claimed is:

1. A boarding ramp for forming a protective passageway for permitting loading of passengers from the ground level exit of an airport terminal or a vehicle to commuter aircraft having a door sill at a different height from the ground level of the terminal or the vehicle, the boarding ramp comprising:
    at least one fixed-height corridor unit having a rear end and a forward end, said rear end abuttable to the terminal or the vehicle at the ground level exit thereof;
    a gangway corridor unit having a rear end and a forward end, said rear end of said gangway corridor unit joined at ground level to said forward end of said at least one fixed-height corridor unit, said gangway corridor unit being provided with a gangway that is pivotally attached at said rear end of said gangway corridor unit and raisable at said forward end of said gangway corridor unit said gangway corridor unit being of increasing height from the height of said at least one fixed-height corridor unit to encompass the height of the door of the aircraft, in relation to said gangway corridor unit, said gangway being selectively inclinable from the ground level of said terminal or said vehicle to the door sill of the aircraft.

2. The boarding ramp according to claim 1, wherein said gangway is selectively inclinable between said ground level of said terminal or said vehicle and said door sill of said aircraft having a height of up to and including sixteen feet.

3. The boarding ramp according to claim 1, wherein a plurality of fixed-height corridor units are arranged end to end in series, each fixed-height corridor unit being formed of at least two sections having a U-shaped frame provided with a pair of transversely separated legs, a connecting roof support and a flooring brace at the lower end of the vertical legs in which a deck is located, the roof supports and flooring braces of one section being at a level different from those of the other sections allowing said sections to be telescoped one within the other.

4. The boarding ramp according to claim 3, having a transitional deck plate extending from the end of each said fixed-height corridor unit and pivotally connectable to the next fixed-height corridor unit in said series to permit passengers to traverse thereover.

5. The boarding ramp according to claim 4, having roller means allowing said at least one fixed-height and gangway corridor units to be selectively moved over the ground between said ground exit of said terminal or said vehicle and the aircraft.

6. The boarding ramp according to claim 5, wherein each of said at least one fixed-height and gangway corridor units is provided with a protective covering sheltering said passengers.

7. The boarding ramp according to claim 1, wherein said at least one fixed-height corridor unit and said gangway corridor unit comprise an elongated frame open at each end, and said gangway is pivotally attached at its rear end to the lower end of said frame at its rear open end and pivoted with means for elevating the gangway at its forward end to the height of the door sill of the aircraft.

8. The boarding ramp according to claim 7, wherein said gangway forms an inclined floor that is covered with decking permitting the passengers to walk thereon.

9. The boarding ramp according to claim 7, wherein said gangway has a horizontal plate at its forward end which is selectively extendible outward of its front end to form a transition floor from said gangway into said aircraft.

10. The boarding ramp according to claim 9, including guide means cooperatively located on the frame of said gangway corridor unit and said horizontal plate to maintain said plate horizontal as it is extendible.

11. The boarding ramp according to claim 9, wherein said means for elevating said gangway comprise reversible motor means and transmission means operable remotely from said boarding ramp.

12. The boarding ramp according to claim 11, wherein said transmission means comprise a pair of scissor levers located on each side of said gangway corridor frame, the levers are guides in said gangway frame at the lower ends thereof and movable in said guides by the transmission means.

13. The boarding ramp according to claim 12, wherein said scissor levers are attached to said horizontal plate and said horizontal plate is pivotally attached to the forward end of said gangway, whereby the movement of said transmission means is directed to both the horizontal plate and said gangway at the same time.

\* \* \* \* \*